UNITED STATES PATENT OFFICE.

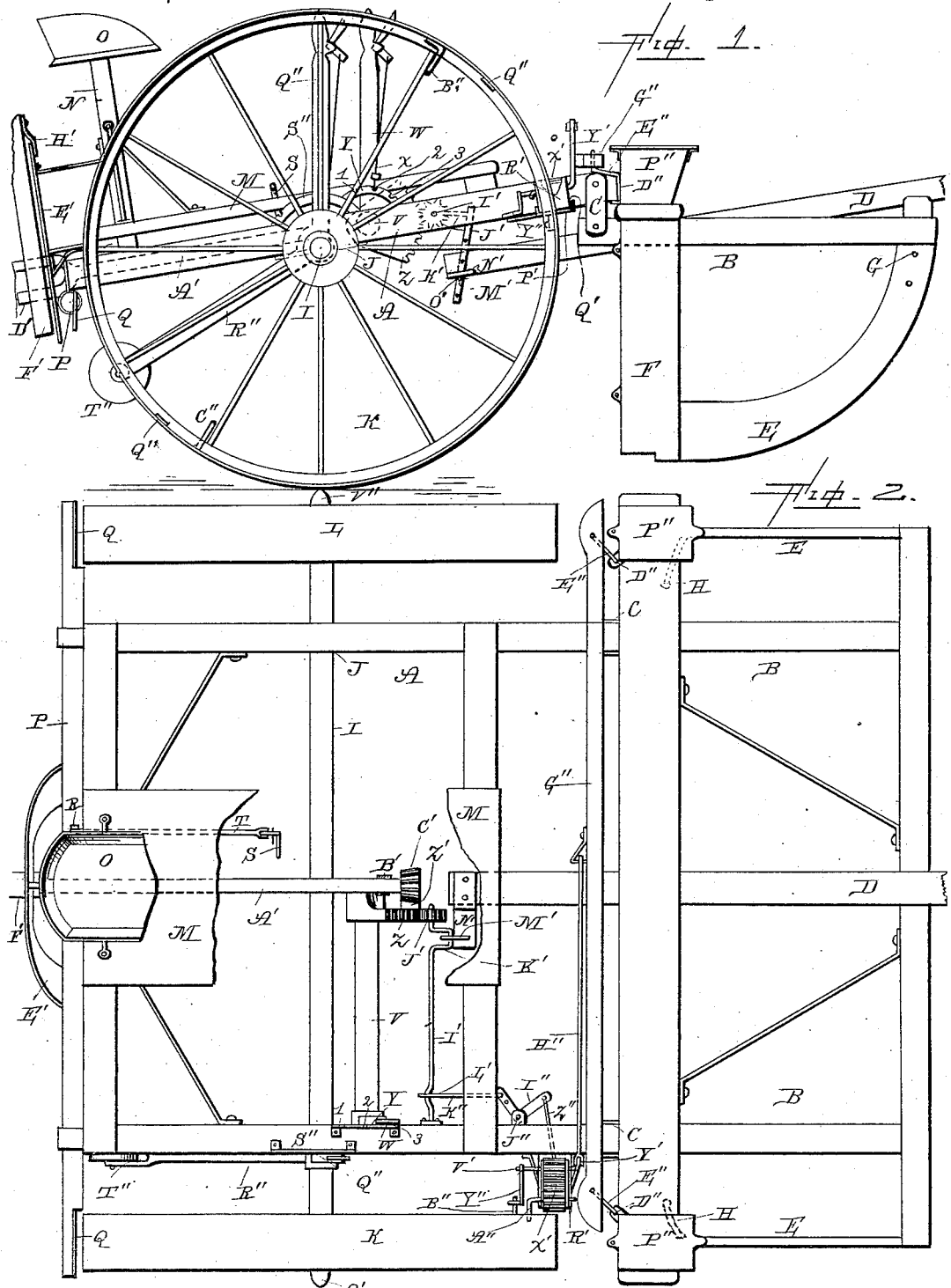

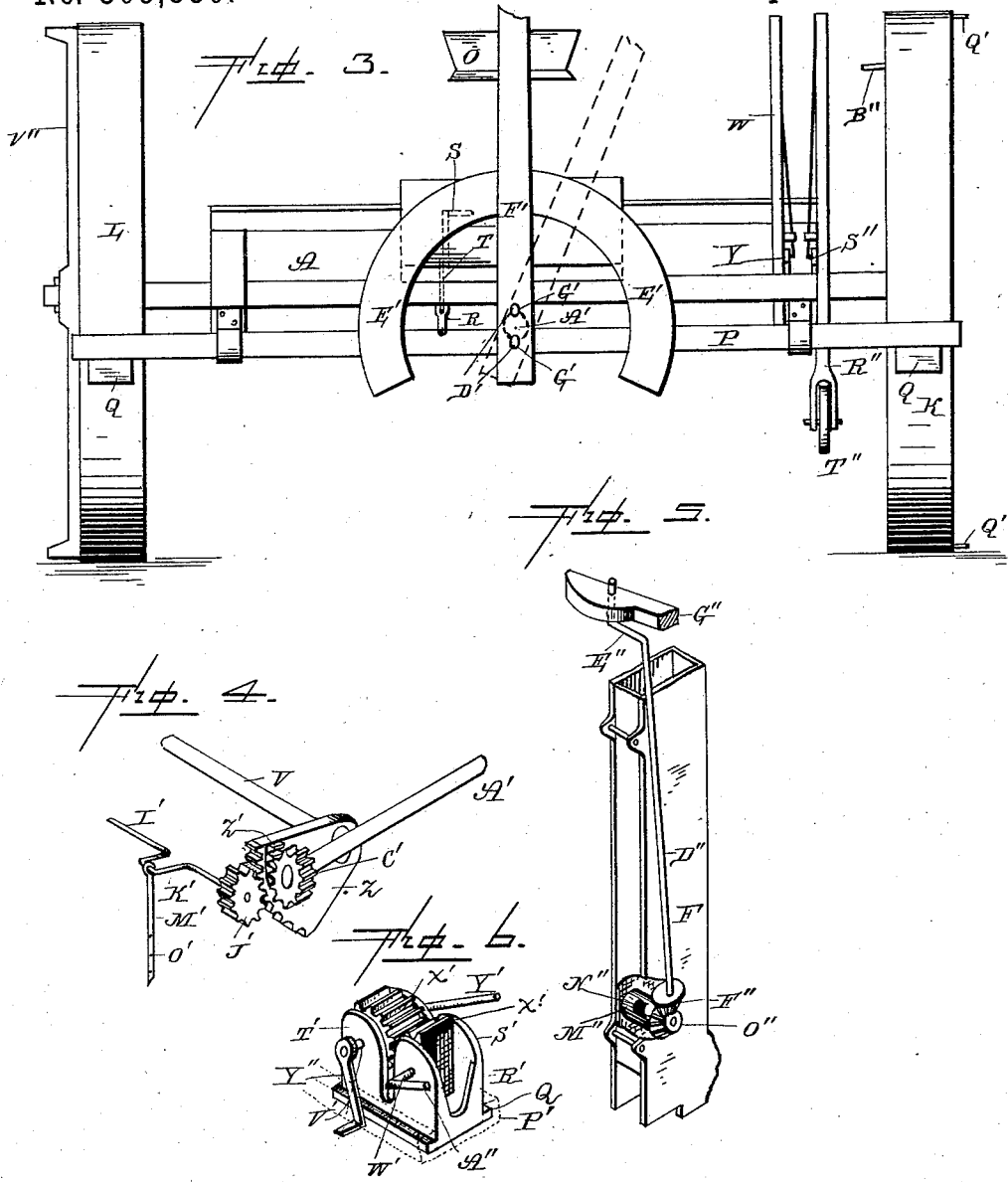

CHARLEY ALBERT PFEIFER, OF COLUMBUS CITY, IOWA.

CORN-PLANTER.

SPECIFICATION forming part of Letters Patent No. 305,330, dated September 16, 1884.

Application filed February 2, 1884. (No model.)

*To all whom it may concern:*

Be it known that I, CHARLEY A. PFEIFER, of Columbus City, in the county of Louisa and State of Iowa, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination and arrangement of devices, whereby the planting mechanism can be thrown in or out of gear, the furrow-openers raised from the ground or lowered thereto, and the marker thrown to either side of the machine or elevated to a vertical position out of the way in transportation, this being accomplished simultaneously by means of a single lever within easy reach of the driver; and it further consists in the peculiar construction and arrangement of parts, that will be more fully described hereinafter, and particularly pointed out in the claims.

In the accompanying drawings, Figure 1 is a side elevation of my invention. Fig. 2 is a top plan view showing the platform partly broken away. Fig. 3 is a rear elevation. Figs. 4, 5, and 6 are details.

A represents the machine-frame, which is here shown as being rectangular in shape; but which may be of any preferred form or construction. To the front of this frame A is hinged a draft-frame, B, as at C. This draft-frame has a tongue, D, secured to it, and is provided with the furrow-openers E and grain-conductors F, which are preferably formed integrally, and are secured to the draft-frame by means of the bolts G and brackets H. The tongue projects rearwardly a suitable distance, so as to have its rear end beneath the front side of the machine-frame.

I represents an axle, which is journaled beneath the center of the frame A in the bearings J, and which has affixed to its right-hand end the driving-wheel K. A wheel, L, of the same size, is loosely secured to the left-hand end of the axle I. The wheels K L have a broad tread, and are immediately behind and in line with the furrow-openers E, so as to cover the seeds that are dropped into the ground through the conductors F. A platform, M, is placed upon the upper side of the machine, extending longitudinally thereon in the line of draft, and to the rear of this platform is secured a standard, N, to the upper end of which is secured a driver's seat, O.

P represents a rock-shaft that is journaled to the rear of the frame A, and is provided at its extremities with the scrapers Q, that are adapted to bear against and scrape the peripheries of the wheels K L.

R represents an arm that projects from the rock-shaft P at right angles thereto. A foot-lever, S, is pivoted to and extends through the platform M, and to the lower end of this lever S is pivoted a connecting-rod, T, which extends rearwardly therefrom, and has its rear extremity pivoted to the upper end of the arm R. By means of this construction the driver sitting on the seat can cause the wheels K L to be scraped when earth adheres to them, as will be readily understood.

V represents a rock-shaft, which is journaled in the frame A a little in advance of the axle I. To the outer end of this shaft is attached a hand-lever, W, which is provided with a catch, X, that is adapted to retain the lever at either of the points 1 2 3 in the rack Y.

To the inner end of the shaft V is secured a spurred segment, Z, which segment is also provided with the crown-teeth Z' on its inner side.

A' represents a rock-shaft that extends from nearly the front of the frame A backward, so as to project slightly beyond the rear side thereof. This rock-shaft A' has its bearings at B', and is provided with a pinion, C', on its front end, which pinion C' meshes with the crown-teeth of the segment Z. The rear extremity of the shaft A' has the projections D'.

E' represents a segmental guard drawn on a radius of which the center of the shaft A' forms the center. This guard is secured to the rear of the machine-frame, as shown.

F' represents a marker of the ordinary construction, which has the openings G' in its inner end, and a catch, H', secured to its inner side near its inner end. The openings G' serve to attach the marker to the rock-shaft, and the catch H' catches over the guard E' and retains the marker in place on the shaft, while allowing it to be swung vertically to either side of the machine.

I' represents a shaft that is journaled in the machine-frame at a suitable distance in advance of the rock-shaft V. This shaft I' has fixed to its inner end a pinion, J', which meshes with the spurred segment Z. A U-shaped crank, K', is formed in the shaft I', near its inner end, and a smaller similar crank, L', is formed in the same shaft, near its outer end, the cranks extending from the shaft at right angles to it and to each other, as shown. A connecting-rod, M', is secured to the crank K', and extends down and is connected to a bracket, N', that is affixed to the inner end of the tongue D. The rod M' has a series of holes made in it, so that it can be connected to the bracket at any desired point by means of a pin, O'.

P' represents a bracket that is secured to and projects from the right forward side of the machine-frame far enough to be nearly in contact with the edge of the wheel K. In the upper side of this bracket is formed a groove or way, Q', in which a block, R', reciprocates. From the upper side of the block project two pairs of ears, S' T', in which are pivoted the rock-shafts V' W'. These rock-shafts are provided with spurred segments X', which mesh with each other. The forward end of the shaft V' has an upwardly-extending arm, Y', secured to or formed from it, and the rear end of the shaft has a bent tappet-arm, Y'', extending outward to within a very short distance of the inner edge of the wheel K.

To the rear end of the shaft W' is secured a second tappet-arm, A'', which extends at the same angle as the arm Y'', to a suitable distance within the inner edge of the wheel K'. The wheel K' has a tappet-pin, B'', secured to one of its spokes, which pin extends inward from the inner side of the wheel, in such a position as, when the wheel revolves, to come in contact with the bent end of the arm Y''.

Secured to the inner side of the felly of the wheel K', and projecting toward the center of said wheel, is a second tappet-pin, C'', which is secured to the wheel directly opposite the pin B'', and is adapted as the wheel revolves to strike against and operate the tappet-arm A''.

Journaled on the sides of the grain-conductors F are the upwardly-extending shafts, D'', which have their upper ends bent so as to form cranks E''. The lower ends of said shafts have secured to them the miter-pinions F''.

G'' represents a bar that connects the cranks of the shaft D''. A connecting-rod, H'', is pivoted to the inner side, at the center of the bar G'', and the outer end of this rod H'' is pivoted to the upper end of the arm Y'.

I'' represents a bell-cranked lever that is pivoted to the frame A at the point J'', and has its inner end connected by the connecting-rod K'' to the crank L', and its outer end connected by means of the rod Z'' to the reciprocating block R'. Near the lower ends of the conductors F are journaled the transverse cylinders M'', which are provided with the seed-cups or depressions N'' on opposite sides. In these depressions may be placed disks, that are raised or lowered by means of screws, so as to regulate the quantity of grain planted. A miter-pinion, O'', is applied to the inner end of each of the cylinders, which pinions O'' mesh with the miter-pinions F''. Hoppers P'' are secured to the draft-frame B above the conductors F.

The operation of these parts of my invention is as follows: Horses are harnessed to the tongue, and its outer end is secured to a yoke (not shown) that is attached to the collars of the horses. This mode of harnessing gives the outer end of the tongue but a very slight vertical play. When the hand-lever W is at the point 2 of the rack X, the marker is held at a vertical position, the reciprocating block and its operating tappet-arms and mechanisms are drawn down inward, so as to keep the tappet-arms from being operated by the rotation of the driving-wheel, and the outer end of the tongue being fulcrumed to the horses, its inner end is elevated by the crank K' and connecting-rod M', and consequently the draft-frame is raised, so that the furrow-openers do not touch the ground. While at this point the machine can be drawn from place to place without operating. By moving the hand-lever to the point 3, the marker is swung over to the right of the machine, the reciprocating block and its operating mechanism are moved out, so as to bring the tappet-arms into the path of the tappet-rods on the driving-wheel, the furrow-openers are lowered to the ground, and the machine is ready for operation, as will be readily understood. By moving the hand-lever back to the point 1 the marker will be swung over the left of the machine, and the planter will be ready for operation, as before.

By this connection of devices the driver can control by a single lever all of the various mechanisms for throwing the planting mechanism out of and in gear, and the marker to either side, as may be desired, or elevated out of the way when the machine is being driven along and not in operation.

To the wheel K are attached the markers Q' for making a depression in the ground, in order to show where the seeds are deposited, and to the other end of the shaft I are rigidly attached the markers V'', which revolve with the shaft I and driving-wheel K independently of the loose wheel L, the markers V'' and those on the wheel K being always in line with each other.

R'' represents an angular lever, which is pivoted on the shaft I at the right of the machine-frame, has a handle at its upper end, and a catch for latching it in any desired position in the segmental rack S″. To the lower end of this lever is journaled a roller, T″.

In operating the machine, when a turn is made at the end of the row, the heels of the furrow-openers are brought in line with the last marks of the finished rows. The driver, by means of the lever Q″, raises the drive-wheel from the ground, and turns it so as to cause one of the tappet-rods upon it to come in contact with one of the tappet-arms of the planting mechanism. The wheel is then lowered and the machine started, and the seed will be planted in straight rows.

Having thus described my invention, I claim—

1. The combination of the machine-frame, draft-frame secured thereto, a tongue, furrow-openers, a planting mechanism secured to said draft-frame, driving wheel or wheels secured to said machine-frame, a mechanism for operating the seed-planters, a mechanism for raising the furrow-openers from the ground, and a mechanism for swinging the marker to either side of the machine or raising it vertically out of the way, the mechanism for raising the furrow-openers, for throwing the planting mechanism in and out of gear, and for controlling the marker being operated by and connected to a single lever, whereby they may all be actuated simultaneously and with a single effort of the driver, substantially as set forth.

2. The combination of the shaft A′, journaled longitudinally in the machine-frame, pinion C′, secured to said shaft, marker F′, attached to the rear of said shaft, transverse shaft V, journaled in the machine-frame, lever W, attached to said shaft, and a segment having crown-teeth which mesh with the pinion C′, whereby the marker can be caused to operate upon either side of the frame or be raised to a vertical position, substantially as shown and described.

3. The combination of the frame A, longitudinal shaft A′, journaled therein, pinion C′, a marker, F′, secured to said shaft, transverse shaft V, journaled in said machine-frame, segment Z, secured to said transverse shaft, and having crown-teeth that mesh with the pinion C′, a lever for controlling the transverse shaft, shaft I′, journaled in said machine-frame, having the pinion J and crank K′, with the draft-frame that is pivoted to the front of the machine, said draft-frame being provided with a seed-planting mechanism, furrow-openers, a tongue, and a connecting-rod for connecting the tongue to the crank K′, substantially as set forth.

4. The combination of the machine-frame, a draft-frame pivoted thereto, a tongue, furrow-openers, and seeding mechanism secured to the draft-frame, and longitudinal shaft journaled in the machine-frame, a marker and a pinion secured to said shaft, a transverse shaft having a segment provided with teeth for meshing with the pinion, a lever for controlling said shaft, shaft I′, journaled in the machine-frame, having cranks K′ L′, pinion J′, connecting-rod M′, bell-crank lever I″, connecting-rod K″, reciprocating block R′, having tappet-arms, and a connecting mechanism for actuating the planting mechanism, a drive-wheel provided with tappet-rods for actuating the tappet-arms on the reciprocating block, substantially as set forth.

In testimony whereof I affix my signature in presence of two witnesses.

CHARLEY ALBERT PFEIFER.

Witnesses:
L. W. HUFF,
F. CASSABAUM.